United States Patent [19]

Yoshida

[11] Patent Number: 5,808,753
[45] Date of Patent: Sep. 15, 1998

[54] FACSIMILE APPARATUS WHICH COMBINES DATA RECEIVED FROM THE SAME SENDING PARTY AT DIFFERENT TIMES AND OUTPUTS THE COMBINED DATA A PLURALITY OF TIMES

[75] Inventor: Takehiro Yoshida, Tokyo, Japan

[73] Assignee: Canon Kabushiki Kaisha, Tokyo, Japan

[21] Appl. No.: 850,870

[22] Filed: May 2, 1997

Related U.S. Application Data

[60] Continuation of Ser. No. 556,541, Nov. 13, 1995, which is a division of Ser. No. 233,419, Apr. 28, 1994, Pat. No. 5,497,247.

[30] Foreign Application Priority Data

Apr. 30, 1993 [JP] Japan ................................. 5-127940
Apr. 30, 1993 [JP] Japan ................................. 5-127941

[51] Int. Cl.⁶ .................................................. H04N 1/32
[52] U.S. Cl. .......................... 358/437; 358/438; 358/440; 358/468
[58] Field of Search ................................. 358/437, 438, 358/440, 468, 434, 435, 436, 406, 405, 403, 296

[56] References Cited

U.S. PATENT DOCUMENTS

| | | |
|---|---|---|
| 4,622,592 | 11/1986 | Ikehata et al. . |
| 4,717,966 | 1/1988 | Bergquist ................................. 358/439 |
| 4,829,524 | 5/1989 | Yoshida . |
| 4,887,162 | 12/1989 | Arai ......................................... 358/434 |
| 5,031,179 | 7/1991 | Yoshida et al. . |
| 5,103,318 | 4/1992 | Takaoka .................................. 358/437 |
| 5,126,858 | 6/1992 | Kurogane et al. ....................... 358/450 |
| 5,172,246 | 12/1992 | Yoshida . |
| 5,220,439 | 6/1993 | Yoshida . |
| 5,224,180 | 6/1993 | Tadokoro . |
| 5,335,085 | 8/1994 | Nakatsuma ............................. 358/437 |
| 5,438,427 | 8/1995 | Yoshida .................................. 358/405 |

FOREIGN PATENT DOCUMENTS

| | | |
|---|---|---|
| 2641429 | 7/1990 | France . |
| 3415839 | 11/1994 | Germany . |
| 60-263570 | 12/1985 | Japan ................................. H04N 1/32 |
| 1-81571 | 3/1989 | Japan ................................. H04N 1/21 |
| 2-218264 | 8/1990 | Japan . |
| 4-40066 | 2/1992 | Japan . |
| 4-329756 | 11/1992 | Japan ................................. H04N 1/21 |
| 9207440 | 4/1992 | WIPO . |

OTHER PUBLICATIONS

Patent Abstracts of Japan, JP1209872, vol. 13, No. 518, Aug. 23, 1989.
Patent Abstracts of Japan, JP3053758, vol. 15, No. 200, Mar. 7, 1991.
Patent Abstracts of Japan, JP4135370, vol. 16, No. 408, May 8, 1992.
Pat. Abs. Jp., vol. 16, No. 224 (E–1206) May 25, 1992 (JP–A–04040066).
Pat. Abs. Jp., vol. 15, No. 465 (E–1138) Nov. 26, 1991 (JP–A–03201762).

*Primary Examiner*—Scott Rogers
*Attorney, Agent, or Firm*—Fitzpatrick, Cella, Harper & Scinto

[57] ABSTRACT

A facsimile apparatus which can output a plurality of copies of received information includes a reception unit, a printer, and a controller. When a plurality of copies of received information are to be output, the controller adds information, indicating that the plurality of copies of received information are output, to each copy of recorded information.

22 Claims, 14 Drawing Sheets

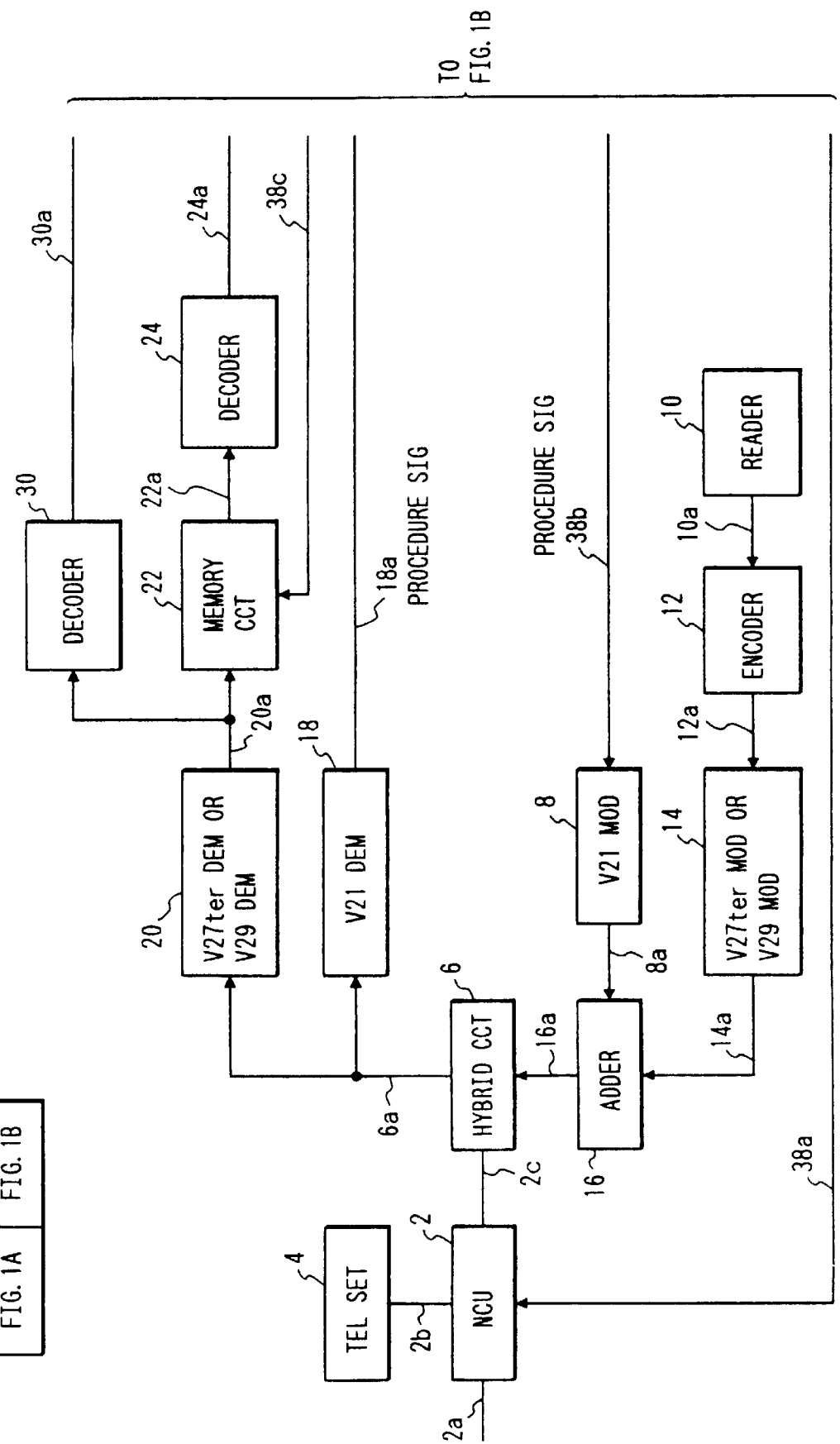

FIG. 7A

RECEIVER STATION OUTPUTS PLURAL
COPIES OF SHEETS

| THE 1ST FAX DEVELOPMENT DEP. |

THE 2ND FAX DEVELOPMENT DEP.

FAX MARKET PLANNING DEP.

FAX PROJECTING DEP.

FIG. 7B

RECEIVER STATION OUTPUTS PLURAL
COPIES OF SHEETS

THE 1ST FAX DEVELOPMENT DEP.

| THE 2ND FAX DEVELOPMENT DEP. |

FAX MARKET PLANNING DEP.

FAX PROJECTING DEP.

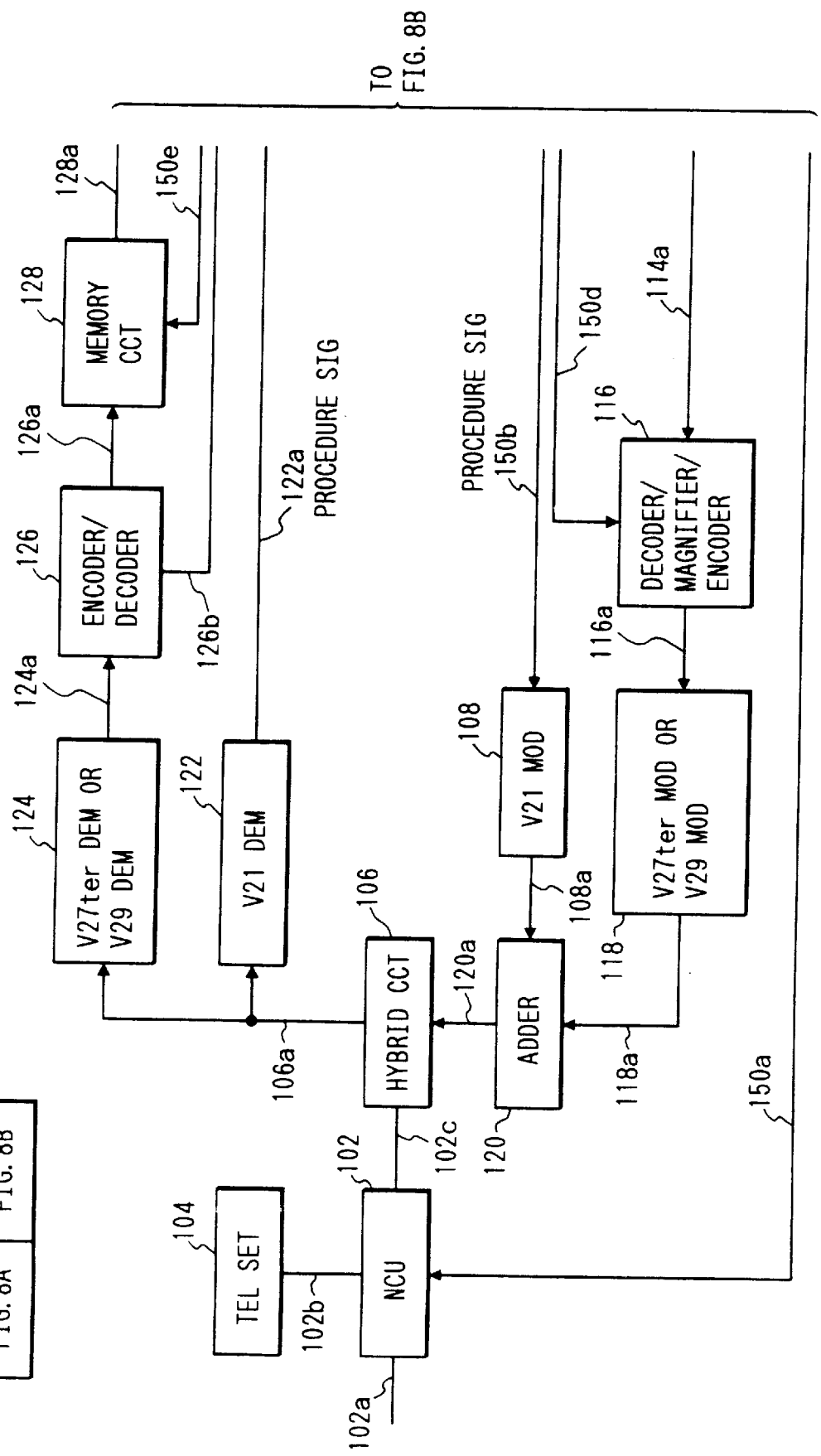

FACSIMILE APPARATUS WHICH COMBINES DATA RECEIVED FROM THE SAME SENDING PARTY AT DIFFERENT TIMES AND OUTPUTS THE COMBINED DATA A PLURALITY OF TIMES

This application is a continuation of application Ser. No. 08/556,541, filed on Nov. 13, 1995, which is a divisional of application Ser. No. 08/233,419, filed on Apr. 28, 1994, now U.S. Pat. No. 5,497,247.

BACKGROUND OF THE INVENTION

1. Field of the Invention

The present invention relates to a facsimile apparatus with a function of outputting a plurality of copies of received information.

2. Description of the Related Art

Conventionally, a facsimile apparatus which outputs a plurality of copies of received information at a receiver station has been proposed. In such a facsimile apparatus, when a mode for outputting a plurality of copies of received information is selected in advance, an apparatus which outputs a plurality of copies of received information, and further outputs respective addresses on the plurality of copies of output information as addressees has also been proposed.

However, in conventional facsimile apparatuses, since only one addressee is recorded on each of a plurality of copies of output received documents, a person who received a copy of a received document can only recognize the addressee recorded on the document, and cannot recognize whether this document is sent to only him or her, or is also sent to other persons. For this reason, the person may consider, depending on the contents of information, that the document should be distributed to other departments. In this case, the person must confirm whether or not the document is distributed to other addressees by some method, resulting in an extreme inconvenience in practice.

Also, conventionally, a facsimile apparatus which can output a plurality of copies of received information by setting the number of copies to be output in advance has been proposed.

In such a facsimile apparatus, when a mode of outputting a plurality of copies of received information is selected, the plurality of copies of received information are output even in a communication on which a communication error occurred.

Even when information is re-sent from an error page, the apparatus also outputs a plurality of copies of received information.

However, received information whose communication has a communication error does not include a complete set of information, i.e., includes incomplete information. When a plurality of copies of incomplete received information are output, this often results in waste of recording sheets.

Since a plurality of copies of information which is re-sent from an error page in the communication on which a communication error occurred are also output, received information in the communication on which a communication error occurred and received information in the re-communication from the error page are mixed, resulting in an inconvenience for a user.

SUMMARY OF THE INVENTION

It is an object of the present invention to improve a facsimile apparatus.

It is another object of the present invention to provide a facsimile apparatus which can clearly present distribution information to a plurality of addressees when a plurality of copies of a received document are output, and are distributed to the plurality of addressees, thus eliminating unnecessary confusion.

It is still another object of the present invention to provide a facsimile apparatus which can avoid waste caused by an unconditional output operation of a plurality of copies when an error occurs in a communication in which a mode of outputting a plurality of copies of received information is selected, and can improve operability of the above-mentioned plural-copies output function.

BRIEF DESCRIPTION OF THE DRAWINGS

FIGS. 7A and 7B are explanatory views showing examples of output images in the sixth embodiment of the present invention;

DETAILED DESCRIPTION OF THE PREFERRED EMBODIMENTS (First Embodiment)

Figure 1B:
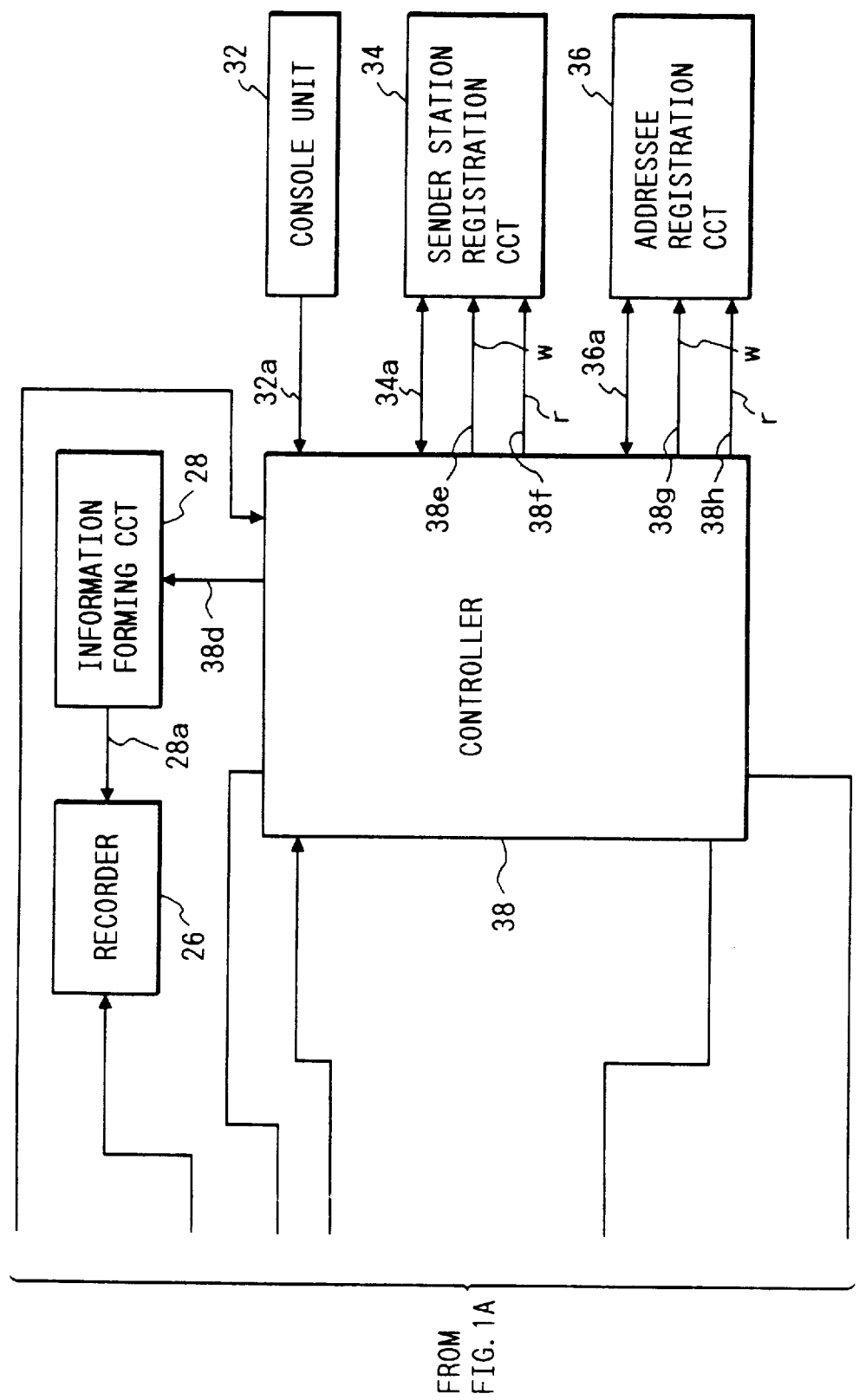
FIG. 1 is comprised of FIGS. 1A and 1B showing block diagrams of the first embodiment of the present invention.

FIGS. 1A and 1B are block diagrams showing the first embodiment of the present invention.

An NCU (network control unit) 2 connects a telephone network to a terminal of the line to use it in, e.g., data communications, and performs connection control of a telephone exchange network, switching to a data communication path, and holding of a loop. When a signal level (signal line 38a) from a controller 38 is "0", the NCU 2 connects a telephone line 2a to the telephone set 4 side; when the signal level is "1", the NCU 2 connects the telephone line 2a to the facsimile apparatus side. In a normal state, the telephone line 2a is connected to the telephone set 4 side.

A hybrid circuit 6 separates signals of a transmission system and signals of a reception system from each other. The hybrid circuit 6 sends a transmission signal from an adder 16 onto the telephone line 2a via the NCU 2, receives a signal from a sender station via the NCU 2, and supplies the received signal to a V29 demodulator 20 and a V21 demodulator 18 via a signal line 6a.

A V21 modulator 8 is a modulator for performing modulation based on the known CCITT recommendation V21. The modulator 8 modulates a procedure signal (a signal line 38b) from the controller 38, and sends the modulated signal to the adder 16 via a signal line 8a.

A reader 10 sequentially reads an image signal for one line in the main scanning direction from an original to be transmitted, generates a signal train representing two values, i.e., black and white, and sends this data to an encoder 12 via a signal line 10a. The reader 10 comprises an imaging element such as a CCD (charge coupled device), or the like, and an optical system.

The encoder 12 receives read data output on the signal line 10a, encodes the read data by MH or MR coding, and outputs the encoded data via a signal line 12a.

A V27ter or V29 modulator 14 receives the encoded data from the signal line 12a, modulates the encoded data based on the known CCITT recommendation V27ter (differential phase modulation) or V29 (orthogonal modulation), and outputs the modulated data to the adder 16 via a signal line 14a.

The adder 16 is a circuit for adding the outputs from the modulators 8 and 14. The output from the adder 16 is supplied to the hybrid circuit 6.

The V21 demodulator 18 performs demodulation based on the known CCITT recommendation V21. The demodulator 18 receives a procedure signal from the hybrid circuit 6 via the signal line 6a, performs V21 demodulation, and supplies demodulated data to the controller 38 via a signal line 18a.

The V27ter or V29 demodulator 20 performs demodulation based on the known CCITT recommendation V27ter or V29. The demodulator 20 receives a modulated image signal from the hybrid circuit 6, demodulates the image signal, and sends the demodulated signal to a memory circuit 22 and a decoder 30 via a signal line 20a.

The memory circuit 22 stores demodulated data output on the signal line 20a on the basis of a control signal on a signal line 38c from the controller 38, and sends the stored data to a decoder 24 via a signal line 22a.

The decoder 24 is a circuit for decoding data from the signal line 22a by MH or MR decoding. The decoder 24 outputs the decoded data to a recorder 26 via a signal line 24a.

The recorder 26 receives data output on the signal line 24a and a signal line 28a, and sequentially records the received data line by line.

An information forming circuit 28 receives information indicating that a plurality of copies are output, information indicating addressees of the output copies, dot information, and the like, which are output on a signal line 38d, and outputs these pieces of information onto the signal line 28a as a dot pattern.

The decoder 30 receives a signal output on the signal line 20a, and outputs MH- or MR-decoded data onto a signal line 30a.

A console unit 32 has a ten-key pad, one-touch dial keys, abbreviated dial keys, a registration button of a sender station for which a plural-copies output operation is performed at a receiver station (to be referred to as a plural-copies output sender station hereinafter), a registration button of a plurality of addressees to be output in correspondence with each group, and the like, and outputs depressed key information onto a signal line 32a.

A registration circuit 34 is a circuit for registering a plural-copies output sender station. In this embodiment, five groups of sender stations can be registered. A plurality of sender stations can be registered in each group. Since the plurality of sender stations can be registered, a plural-copies output operation can be performed for information transmitted from a plurality of sender stations by common processing.

When sender stations are to be registered in the registration circuit 34, a group number (one of 01 to 05; e.g., 01), space, and telephone numbers (e.g., 03-3467-1111, 03-3485-1122) of a plurality of sender stations corresponding to the group number are output onto a signal line 34a, and thereafter, a write pulse is generated onto a signal line 38e. When data registered in the registration circuit 34 is to be read out, the group number (e.g., 01) is output onto the signal line 34a, and thereafter, a read pulse is generated onto a signal line 38f, thereby outputting telephone numbers (e.g., 03-3467-1111, space, 03-3485-1122) registered in correspondence with the group number "01" onto the signal line 34a.

A registration circuit 36 is a circuit for registering a plurality of addressees to be output in correspondence with each of the above-mentioned groups. When a plurality of addressees are to be registered in the registration circuit 36, a group number (one of 01 to 05; e.g., 02), and a plurality of addressees (e.g., the first facsimile development department, the second facsimile development department, the facsimile market planning department, the facsimile projecting department) to be output in correspondence with the group are output onto a signal line 36a, and thereafter, a write pulse is generated onto a signal line 38g. When data registered in the registration circuit 36 is to be read out, a group number (e.g., 02) is output onto the signal line 36a, and a read pulse is generated onto a signal line 38h, thereby outputting the plurality of addressees (e.g., the first facsimile development department, space, the second facsimile development department, space, the facsimile market planning department, space, the facsimile projecting department) registered in correspondence with the group number "02" onto the signal line 36a.

The controller 38 mainly performs the following control operations in this embodiment. Addressees to which a plurality of copies of received information are output are registered at a receiver station, and upon reception of information from a specific sender station, a plurality of copies of received information are output. When the plurality of copies of received information are output, information indicating that the plurality of copies are output is added to each copy of recorded information, and information representing an addressee corresponding to one copy of recorded information and information representing addressees corresponding to the remaining copies of recorded information are added. These pieces of additional information are recorded on a page in addition to the copy of received information, and this page is added before the copy of received information.

Figure 2:
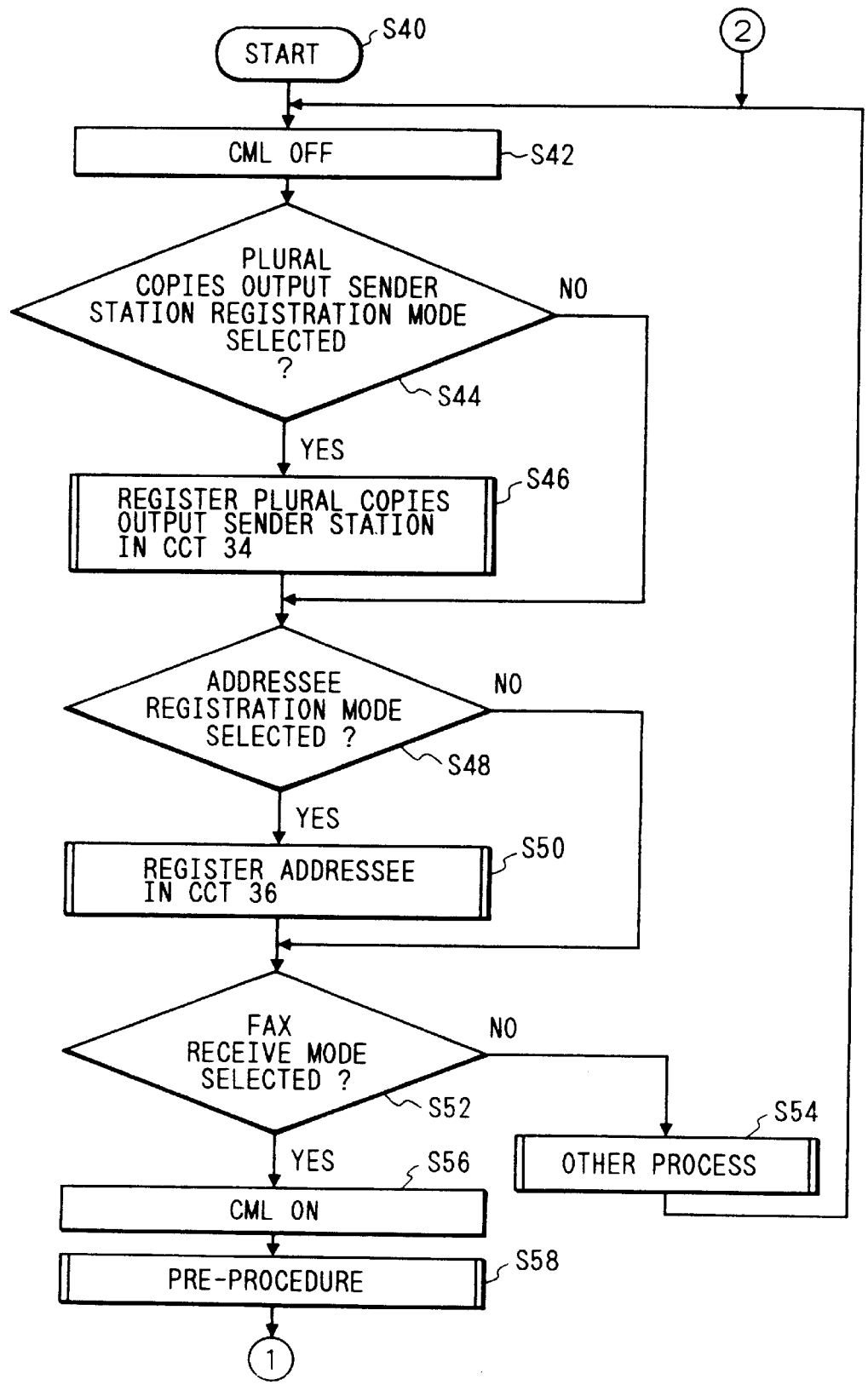
FIG. 2 is a flow chart showing the operation of the first embodiment.
Figure 3:
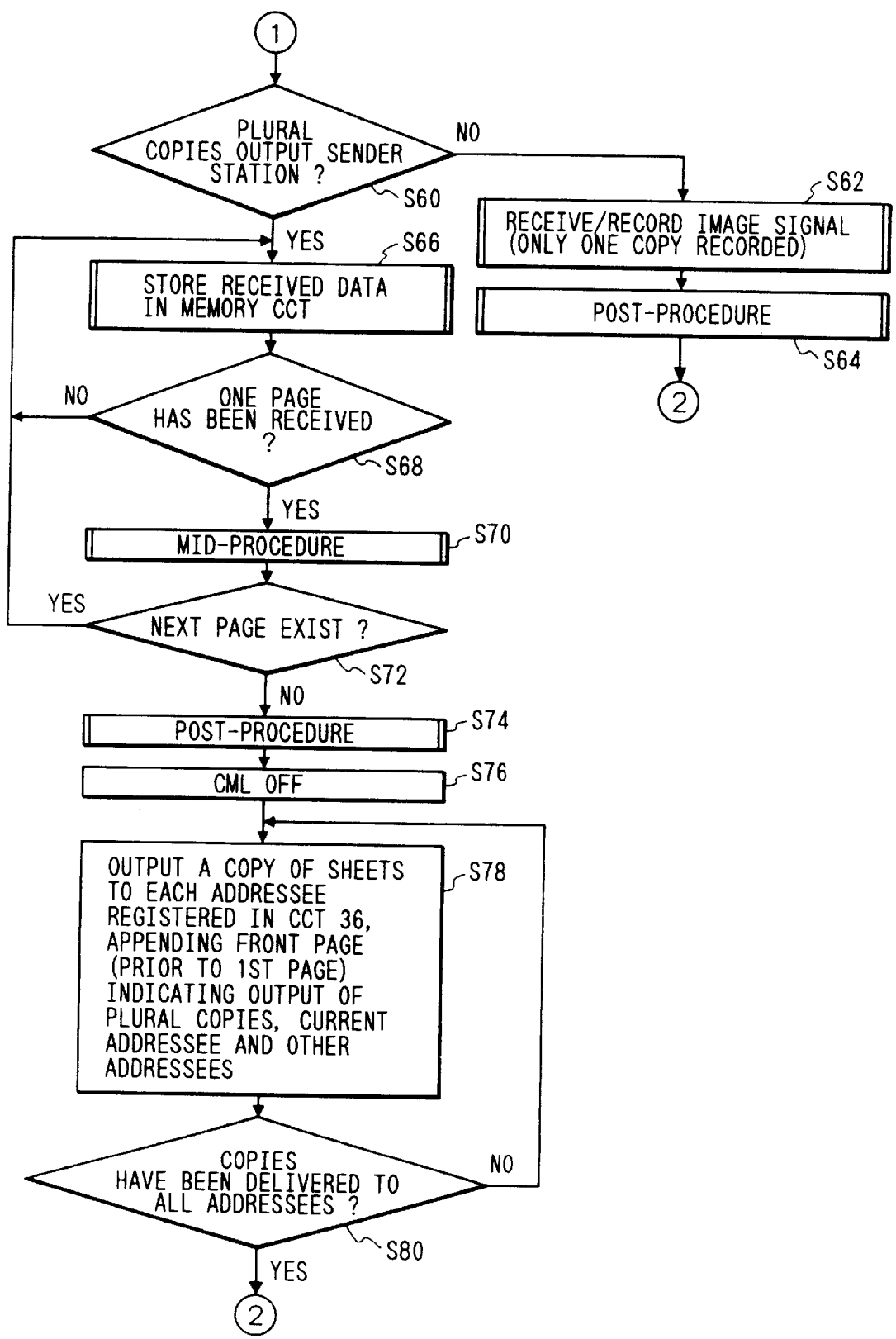
FIG. 3 is a flow chart showing the operation of the first embodiment.

FIGS. 2 and 3 are flow charts showing the processing operations of the controller 38 in this embodiment.

In step S42, the controller 38 outputs a signal of signal level "0" onto the signal line 38a to turn off a CML, and checks in step S44 if a plural-copies output sender station registration mode is selected. If YES in step S44, the flow advances to step S46, and the controller 38 registers a plural-copies output sender station in, e.g., group 01 in the registration circuit 34.

However, if NO in step S44, the flow jumps to step S48 to check if a registration mode of a plural-copies output addressee at a receiver station is selected. If YES in step S48, the flow advances to step S50, and a plural-copies output addressee at the receiver station is registered in, e.g., group 01 in the registration circuit 36.

On the other hand, if NO in step S48, the flow jumps to step S52 to check if a facsimile receive mode is selected. If NO in step S52, the flow advances to step S54 to execute other processing, and the control returns to a standby state (S42).

However, if YES in step S52, the flow advances to step S56, and the controller 38 outputs a signal of signal level "1" onto the signal line 38a to turn-on a CML. In step S58, the controller 38 executes a pre-procedure.

The controller 38 checks in step S60 if a sender station included in a TSI signal sent from the sender station is registered in the registration circuit 34, thereby determining if the sender station is a plural-copies output sender station.

If NO in step S60, the flow advances to step S62, and the controller 38 executes reception of an image signal and an output operation of a copy of the received image signal. After a post-procedure (S64), the control returns to the standby state (S42).

On the other hand, if YES in step S60, the flow advances to step S66 and subsequent steps. In these steps, the controller 38 additionally outputs information indicating that a plural-copies output operation is performed, information representing an addressee corresponding to a copy of recorded information which is being output, and information representing addressees corresponding to the remaining copies of recorded information onto received information, thus executing the plural-copies output operation. In the receive operation in step S66 and subsequent steps, an image signal is temporarily received in the memory circuit 22. However, in the receive operation in step S62, an image signal need not be received in the memory circuit 22.

More specifically, in step S66, the controller 38 stores received information in the memory circuit 22 via the signal line 38c. In step S68, the controller 38 checks if one page has been received. If NO in step S68, the flow returns to step S66 to continue the processing; otherwise, the flow advances to step S70 to execute a mid-procedure. In step S72, the controller 38 checks if the next page exists. If YES in step S72, the flow returns to step S66 to repeat the processing; otherwise, the flow advances to step S74 to execute a post-procedure.

Figure 4A:
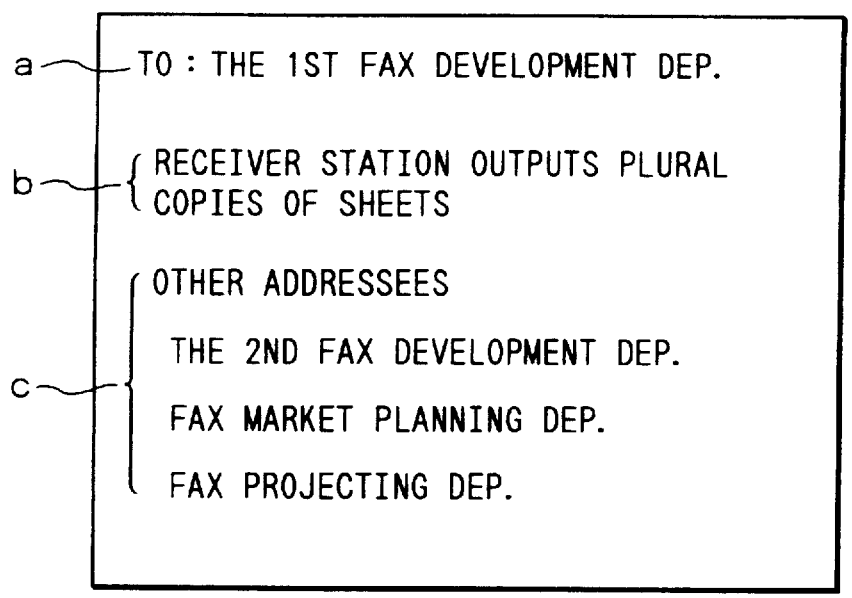
FIGS. 4A and 4B are explanatory views showing examples of output images in the first embodiment.
Figure 4B:
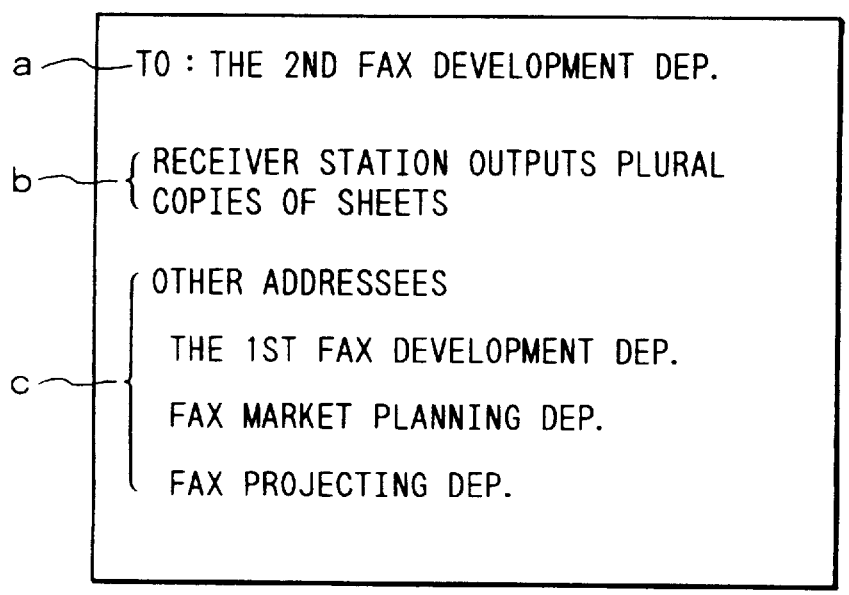

The controller 38 outputs a signal of signal level "0" onto the signal line 38a to turn off a CML in step S76, and performs a plural-copies output operation for addressees registered in the registration circuit 36 in step S78. FIGS. 4A and 4B show examples of information of the first page which is output prior to received information in the plural-copies output mode. As shown in FIGS. 4A and 4B, page information which records a message b indicating that the plural-copies output mode is executed, an addressee a corresponding to a copy of recorded information which is being output, and addressees c corresponding to other copies of recorded information is added before the first page of the received information.

In this case, plural-copies output addressees of the receiver station are the first facsimile development department, the second facsimile development department, the facsimile market planning department, and the facsimile projecting department. The page information shown in FIG. 4A records information indicating that the addressee a of the corresponding recorded information is the first facsimile development department, the message b indicating that the plural-copies output mode is executed, and the message c indicating that copies of the same received information are also delivered to the second facsimile development department, the facsimile market planning department, and the facsimile projecting department. On the other hand, the page information shown in FIG. 4B records information indicating that the addressee a of the corresponding recorded information is the second facsimile development department, the message b indicating that the plural-copies output mode is executed, and the message c indicating that copies of the same received information are also delivered to the first facsimile development department, the facsimile market planning department, and the facsimile projecting department. In addition, similar information is output to the facsimile market planning department and the facsimile projecting department prior to recording of received information.

In step S80, the controller 38 checks if the copies have been delivered to all addressees (i.e., the output operation of the selected number of copies has been completed). If NO in step S80, the flow returns to step S78; otherwise, the flow returns to step S42.

In this embodiment, information indicating that the plural-copies output mode is executed, and information of addressees are output as a separate page (cover page) prior to the outputting of the received information. Alternatively, as the second embodiment of the present invention, these pieces of information may be recorded together with the first page of the received information.

In the first and second embodiments, the plural-copies output operation is performed only when information is received from a specific sender station. Alternatively, as the third embodiment of the present invention, only when a sender station designates a plural-copies output mode to a receiver station may the plural-copies output operation be executed. In this plural-copies output operation as well, information indicating that the plural-copies output mode is executed, information indicating an addressee corresponding to a copy of recorded information, and information indicating addressees corresponding to other copies of recorded information are added.

Figure 5:
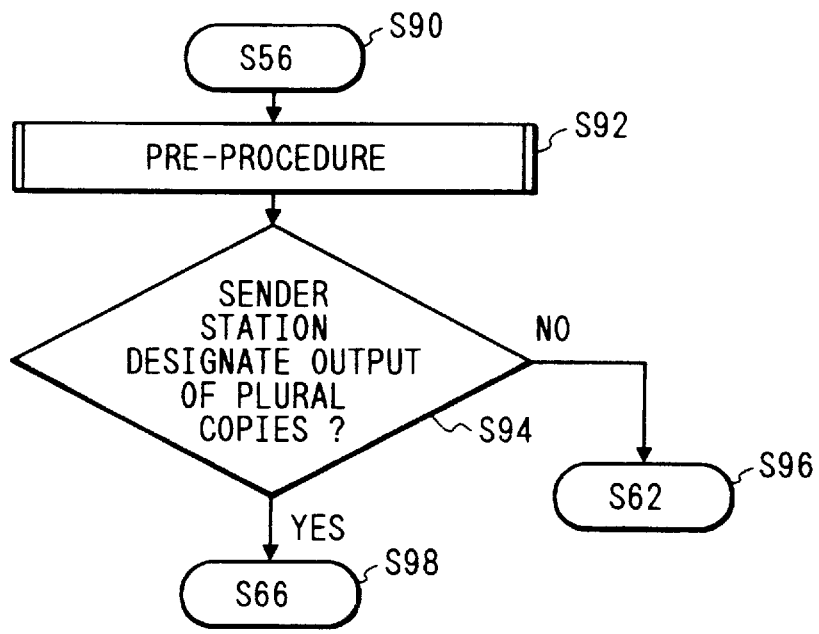
FIG. 5 is a flow chart showing the operation according to the third embodiment of the present invention.

FIG. 5 is a flow chart showing steps different from those in the first embodiment (FIGS. 2 and 3) in the operation of this embodiment.

Referring to FIG. 5, step S90 corresponds to step S56 in FIG. 2. In the pre-procedure in step S92, a receiver station informs a sender station that the receiver station has a plural-copies output function.

In step S94, the controller 38 checks if the sender station designates to output a plurality of copies. If YES in step S94, the flow advances to step S98 (S66); otherwise, the flow advances to step S96 (S62).

In the operation of the first embodiment (FIGS. 2 and 3), group 01 is defined to be a special group for the plural-copies output mode. Alternatively, as the fourth embodiment of the present invention, a plurality of groups of plural-copies output addressees are registered, and a sender station is registered in correspondence with each of these groups. In the receive mode, a sender station is checked, and if the sender station is registered, the plural-copies output operation is performed for addressees registered in correspondence with the sender station. In this case as well, information indicating that the plural-copies output mode is executed, information of an addressee corresponding to a copy of the output information, and information of addressees corresponding to other copies of output information are added to received information.

More specifically, the processing in steps S46, S50, and S60 is executed not only for group 01 but for all of groups 01 to 05. In step S78, the copies are delivered not to addressees registered in group 01 but to those registered in correspondence with the designated group number (one of groups 01 to 05). In this plural-copies output mode, an addressee corresponding to a copy of recorded information which is being output, information indicating that the plural-copies output mode is executed, and addressees corresponding to other copies of recorded information are added as in the first embodiment (FIGS. 4A and 4B).

In the fourth embodiment described above, sender stations are registered in correspondence with a plurality of groups, and in the receive mode, a sender station is checked to execute the plural-copies output operation in correspondence with addresses of the corresponding group. Alternatively, as the fifth embodiment of the present invention, a sender station may designate a plural-copies output group, and the plural-copies output operation may be performed for addressees registered in the designated group.

Figure 6:
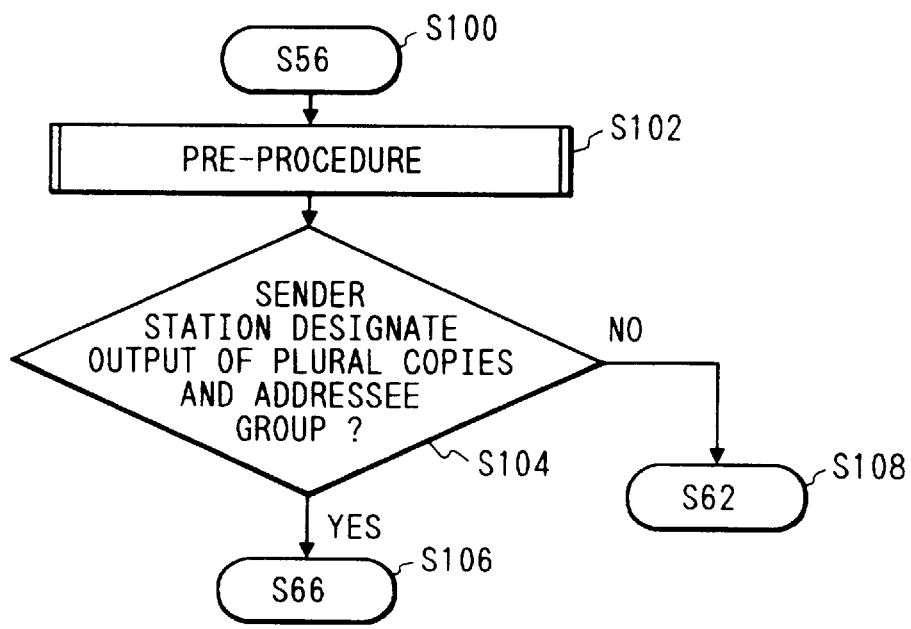
FIG. 6 is a flow chart showing the operation according to the fourth embodiment of the present invention.

FIG. 6 is a flow chart showing steps different from those in the first embodiment (FIGS. 2 and 3) in the operation of this embodiment.

Step S100 corresponds to step S56 in FIG. 2. In the pre-procedure in step S102, a receiver station informs a sender station that the receiver station has a plurality of plural-copies output addressee groups, and a plural-copies output function.

In step S104, the controller 38 checks if the sender station designates both a plural-copies output mode and a group number therefor. If YES in step S104, the flow advances to step S106 (S66 above), and a plurality of copies are delivered to addressees registered in correspondence with the designated group.

If it is determined in step S104 that only the plural-copies output mode is designated, and the group number is not designated, the flow advances to step S106 (S66 above), and a plurality of copies are delivered to addressees registered in correspondence with group number 01. If it is determined in step S104 that the plural-copies output mode is not designated, the flow advances to step S108 (S62 above).

In the above-mentioned plural-copies output mode as well, information of an addressee corresponding to a copy of recorded information which is being output, information indicating that the plural-copies output mode is executed, and information of addressees corresponding to other copies of recorded information are added.

In the above-mentioned embodiments, in the plural-copies output mode, information of an addressee corresponding to a copy of recorded information which is being output is output, information indicating the plural-copies output mode is then output, and finally, information of addressees corresponding to other copies of recorded information is output. Therefore, in this case, character information is re-sorted in units of copies of recorded information to addressees.

Alternatively, as the sixth embodiment of the present invention, information of addressees and information indicating that the plural-copies output mode is executed may be commonly recorded on copies of recorded information to addressees, and of the information of addressees, an addressee corresponding to a copy of recorded information which is being output may be surrounded by a rectangular frame, thereby clarifying the addressee of the copy of recorded information.

More specifically, only the output method of a dot pattern in step S78 is changed. FIGS. 7A and 7B show examples of recorded information in this case. More specifically, FIG. 7A shows recorded information for the first facsimile development department, and FIG. 7B shows recorded information for the second facsimile development department.

Note that as specific information described in the sixth embodiment, other information such as a halftone dot screen may be used.

In addition, in place of designating a group by a sender station, the sender station may directly designate plural-copies output addresses using, e.g., code information.

As described above, according to the present invention, in a facsimile apparatus which can output a plurality of copies of received information, whether or not a plurality of copies of a certain received document are output at the receiver station can be recognized. When the plural-copies output mode is selected, since all addressees can be recognized from a certain received document, repetitive copies to other addresses can be avoided, and work efficiency can be improved.

(Seventh Embodiment)

Figure 8B:
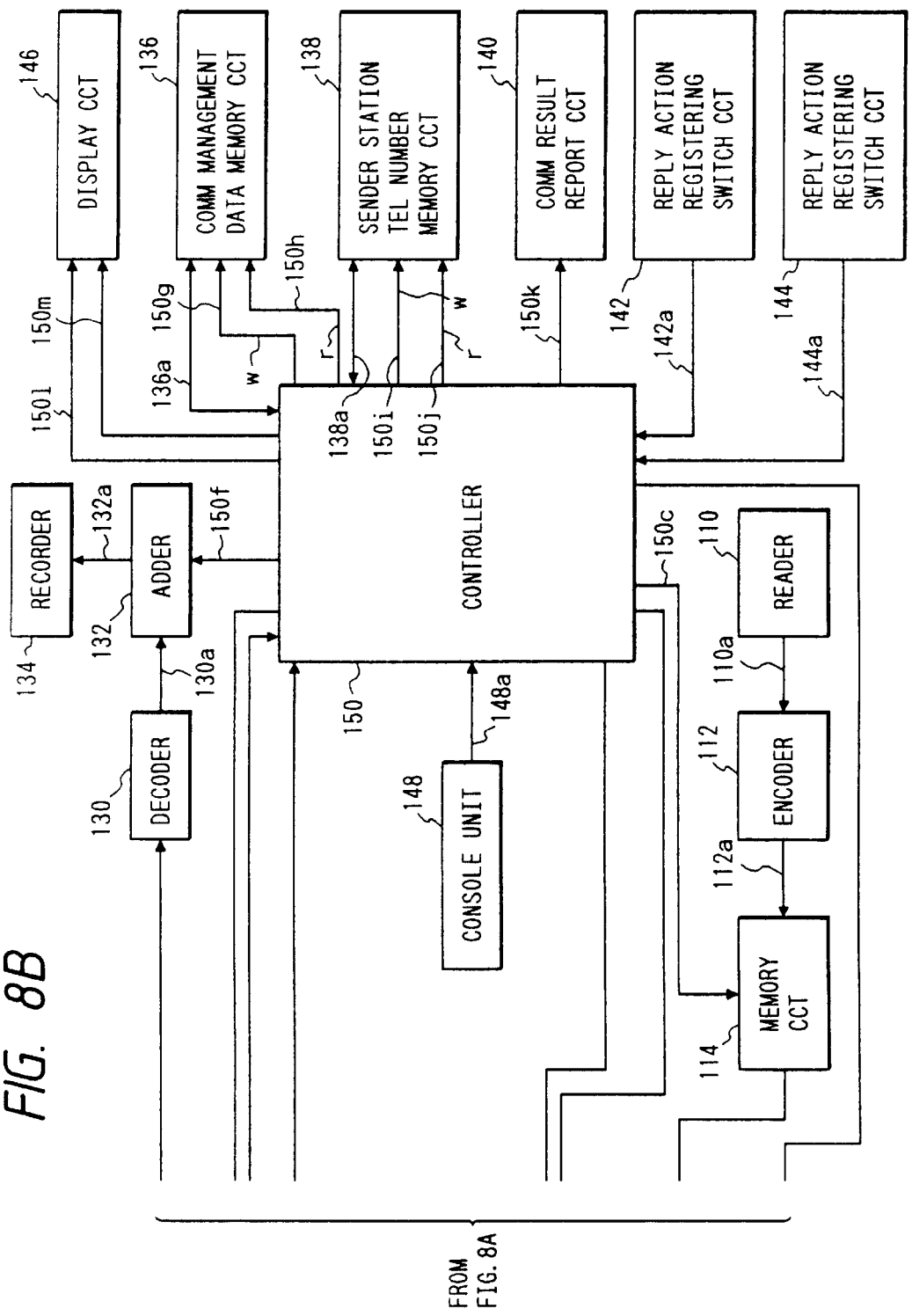
FIG. 8 is comprised of FIGS. 8A and 8B showing block diagrams of the seventh embodiment of the present invention.

FIGS. 8A and 8B show block diagrams of the seventh embodiment of the present invention.

An NCU (network control unit) 102 connects a telephone network to a terminal of the line to use it in, e.g., data communications, and performs connection control of a telephone exchange network, switching to a data communication path, and holding of a loop. When a signal level (signal line 150a) from a controller 150 is "0", the NCU 102 connects a telephone line 102a to the telephone set 104 side; when the signal level is "1", the NCU 102 connects the telephone line 102a to the facsimile apparatus side. In a normal state, the telephone line 102a is connected to the telephone set 104 side.

A hybrid circuit 106 separates signals of a transmission system and signals of a reception system from each other. The hybrid circuit 106 sends a transmission signal from an adder 120 onto the telephone line 102a via the NCU 102, receives a signal from a sender station via the NCU 102, and supplies the received signal to a V29 demodulator 124 and a V21 demodulator 122 via a signal line 106a.

A V21 modulator 108 is a modulator for performing modulation based on the known CCITT recommendation V21. The modulator 108 modulates a procedure signal (via a signal line 150b) from the controller 150, and sends the modulated signal to the adder 120 via a signal line 108a.

A reader 110 sequentially reads an image signal for one line in the main scanning direction from an original to be transmitted, generates a signal train representing two values, i.e., black and white, and sends this data to an encoder 112 via a signal line 110a. The reader 110 comprises an imaging element such as a CCD (charge coupled device), or the like, and an optical system.

The encoder 112 receives read data output on the signal line 110a, performs MR coding of k=8, and outputs encoded data onto a signal line 112a.

A memory circuit 114 stores encoded data output on the signal line 112a in accordance with a control signal on a signal line 150c from the controller 150, and outputs the stored data onto a signal line 114a.

A decoder/magnifier/encoder 116 performs decoding, variable magnification processing in the main scanning and sub-scanning directions, and encoding, as needed, in accordance with a control signal on a signal line 150d from the controller 150, and outputs encoded data onto a signal line 116a.

A V27ter or V29 modulator 118 receives the encoded data from the signal line 112a, modulates the encoded data based on the known CCITT recommendation V27ter (differential phase modulation) or V29 (orthogonal modulation), and outputs the modulated data to the adder 120 via a signal line 118a.

The adder 120 is a circuit for adding the outputs from the modulators 108 and 118. The output from the adder 120 is supplied to the hybrid circuit 106.

The V21 demodulator 122 performs demodulation based on the known CCITT recommendation V21. The demodulator 122 receives a procedure signal from the hybrid circuit 106 via the signal line 106a, performs V21 demodulation, and supplies demodulated data to the controller 150 via a signal line 122a.

The V27ter or V29 demodulator 124 performs demodulation based on the known CCITT recommendation V27ter or V29. The demodulator 124 receives a modulated image signal from the hybrid circuit 106, demodulates the image signal, and sends the demodulated signal to an encoder/decoder 126 via a signal line 124a.

The encoder/decoder 126 receives information output on the signal line 124a, decodes the received information, and outputs decoded data to the controller 150 via a signal line 126b. The controller 150 checks the presence/absence of a communication error based on the decoded data from the signal line 126b. The encoder/decoder 126 encodes the decoded data by MR coding of k=8 again, and outputs the encoded data onto a signal line 126a.

A memory circuit 128 stores data output on the signal line 126a on the basis of a control signal on a signal line 150e from the controller 150, and sends the stored data to a decoder 130 via a signal line 128a.

The decoder 130 is a circuit for performing MR decoding of data sent via the signal line 128a, and outputs the decoded data to an adder 132 via a signal line 130a.

The adder 132 is a circuit for adding data output from the decoder 130 onto the signal line 130a, and data output from the controller 150 onto a signal line 150f, and outputs the sum data to a recorder 134 via a signal line 132a.

The recorder 134 receives data output on the signal line 132a, and sequentially records the received data line by line.

A communication management data memory circuit 136 is a circuit for storing various communication management data indicating whether or not a plurality of copies of received information are to be output, a communication state, a communication end time, and the like in correspondence with communication numbers. The memory circuit 136 can store 100 communication numbers. When data is to be-stored in the memory circuit 136, a communication number (one of 0000 to 9999; e.g., 1003), space, data indicating whether or not a plurality of copies are to be output (0 for only one copy or 1 for a plural-copies output mode; e.g., 1), space, a communication state (0 when a communication is not terminated, 1 when a communication is normally terminated, or 2 when a communication is terminated as an error; e.g., 2), space, and a communication end time only when a communication is terminated as an error (e.g., if it is November 24, p.m. 10:10, 11242210) are output onto a signal line 136a, and thereafter, a write pulse is generated onto a signal line 150g.

On the other hand, when data stored in the memory circuit 136 is to be read out, a communication number (e.g., 1003) is output onto the signal line 136a, and thereafter, a read pulse is generated onto a signal line 150h. Thus, data stored in correspondence with the designated communication number, e.g., the data indicating whether or not a plurality of copies are to be output (the plural-copies output mode is selected since it is 1), space, the communication state (the communication is terminated as an error since it is 2), space, and the communication end time (11242210) are output onto the signal line 136a.

A telephone number memory circuit 138 is a circuit for storing telephone numbers of plural-copies output sender stations. Note that a maximum of 100 telephone numbers of plural-copies output sender stations (sender stations 00 to 99) can be stored in this embodiment. When a telephone number is to be stored in the memory circuit 138, a sender station number (one of 00 to 99; e.g., 15), space, and a sender station telephone number (e.g., 03-3111-2222) are output onto a signal line 138a, and thereafter, a write pulse is generated onto a signal line 150i.

On the other hand, when data stored in the memory circuit 138 is to be read out, a sender station number (e.g., 15) is output onto the signal line 138a, and thereafter, a read pulse is generated onto a signal line 150j. Then, a sender station telephone number (e.g., 03-3111-2222) registered in correspondence with the designated sender station number is output onto the signal line 138a.

A communication result report circuit 140 receives information output on a signal line 150k, and generates a communication result report.

A reply action registering switch 142 is a switch circuit for registering a reply action to be taken upon occurrence of a communication error when a plurality of copies cannot be output, and when a sender station does not have any re-send function. In this embodiment, the switch 142 has three switch states. That is, in a switch 0 state, facsimile information received in a communication which is terminated as an error is not output at all, and only a communication result report is output. In a switch 1 state, only the first page of facsimile information received in a communication which is terminated as an error and a communication result report are output. In a switch state 2, a copy of facsimile information received in a communication which is terminated as an error is output. The switch state is output onto a signal line 142a as 0, 1, or 2.

A reply action registrating switch 144 is a switch circuit for registering a reply action to be taken upon occurrence of a communication error when a plurality of copies cannot be output, and when a sender station has a re-send function. This switch 144 also has three switch states. The operations corresponding to the switch 0, switch 1, and switch 2 states of this reply action registration switch 144 are the same as those described in the paragraph of the reply action registration switch 142. The switch state is output onto a signal line 144a as 0, 1, or 2.

A display circuit 146 is a circuit for displaying a message indicating that the plural-copies output mode is selected but is not executed due to a communication error and information regarding a sender station. When a signal of signal level "1" is output onto a signal line 150m, the display circuit 146 displays a message indicating that the plural-copies output mode is selected but is not executed due to a communication error, and receives and displays a sender station telephone number output on a signal line 150*l*. When a signal of signal level "0" is output onto the signal line 150*m*, the display circuit 146 displays no data.

A console unit 148 has a start key, a ten-key pad, a * key, a # key, and function keys such as a plural-copies output sender station registration key, and the like. Key information of the depressed key is output onto a signal line 148*a*.

The controller 150 mainly performs the following control operations in this embodiment.

In a facsimile apparatus which can output a plurality of copies of received information, when a plural-copies output sender station is registered, and information is received from the registered sender station, i.e., when a plural-copies output communication mode is selected, and an error occurs during a communication, the controller 150 does not output a plurality of copies of facsimile information received at that time, and operates according to the state selected by the switch 142.

The switch 142 is used for registering a reply action to be taken upon occurrence of a communication error when a sender station does not have any re-send function. In this case, a receiver station is assumed to have no function of combining information received before the error and information re-sent from an error page to obtain complete information. In this case, when the switch 142 is set in the switch 0 state, facsimile information received in a communication which is terminated as an error is not output at all, and only a communication result report is output. When the switch 142 is set in the switch 1 state, only the first page of facsimile information received in a communication which is terminated as an error and the communication result report are output. Furthermore, when the switch 142 is set in the switch 2 state, only a copy of facsimile information received in a communication which is terminated as an error is output.

When the plural-copies output communication mode is selected, but the plural-copy output operation is canceled due to an error during a communication, a message indicating that the plural-copy output operation has been tried but cannot be achieved and information regarding the sender station are displayed on the display circuit 146. Also, the message indicating that the plural-copy output operation has been tried but cannot be achieved is added to the communication result report, and when the first page of error information is output, the message is added to the first page.

Figure 9:
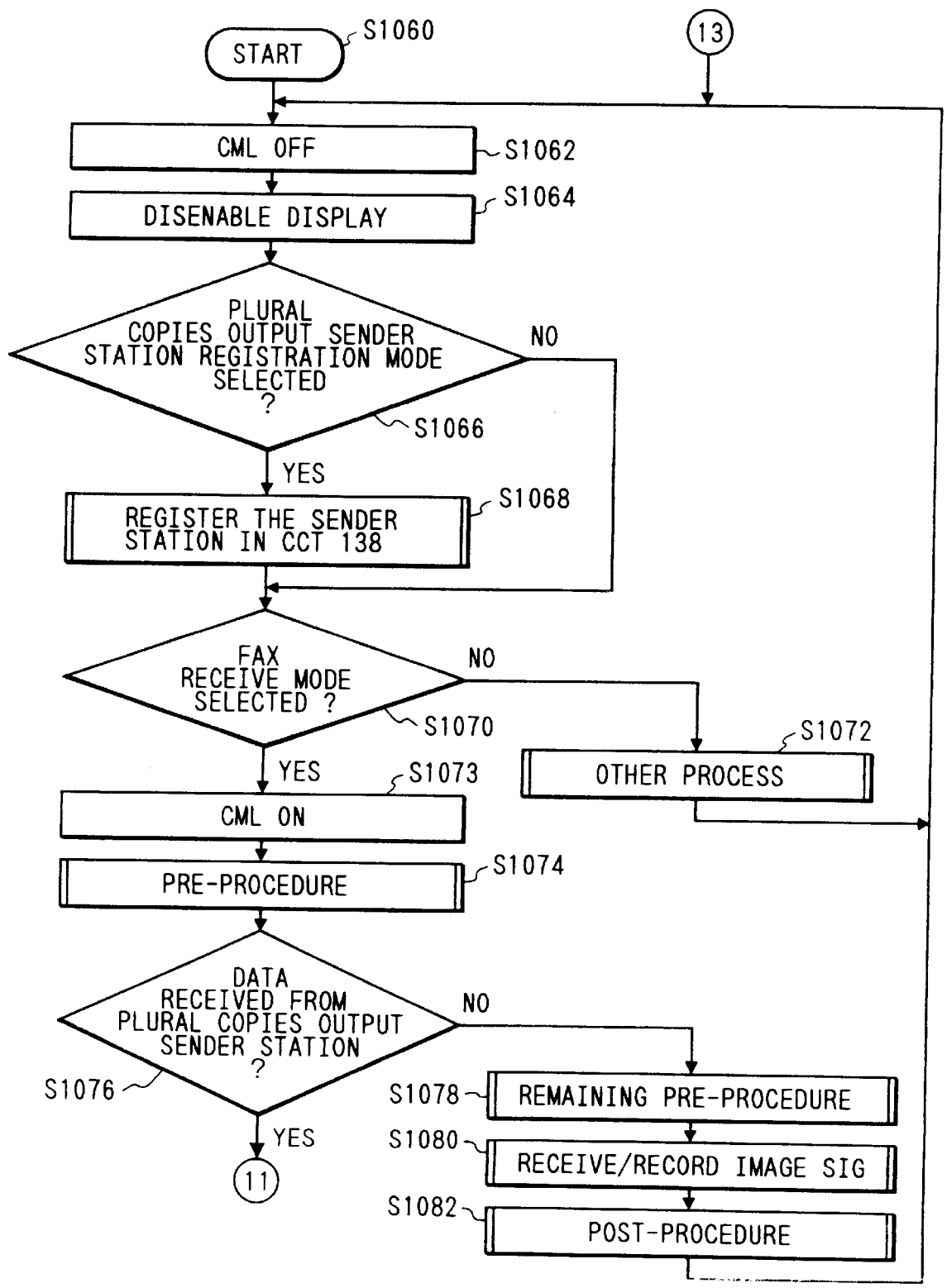
FIG. 9 is a flow chart showing the operation of the seventh embodiment.
Figure 10:
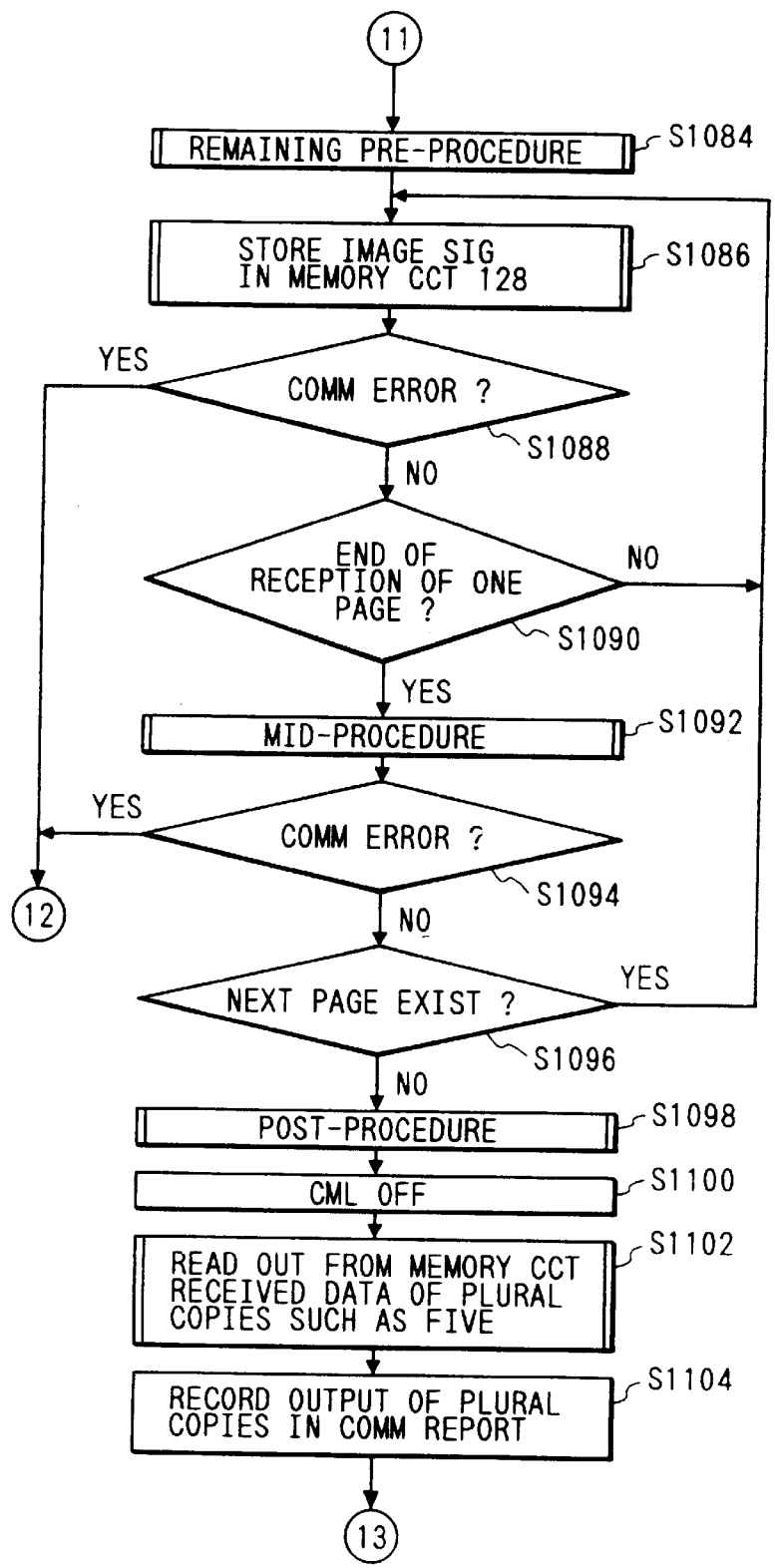
FIG. 10 is a flow chart showing the operation of the seventh embodiment.
Figure 11:
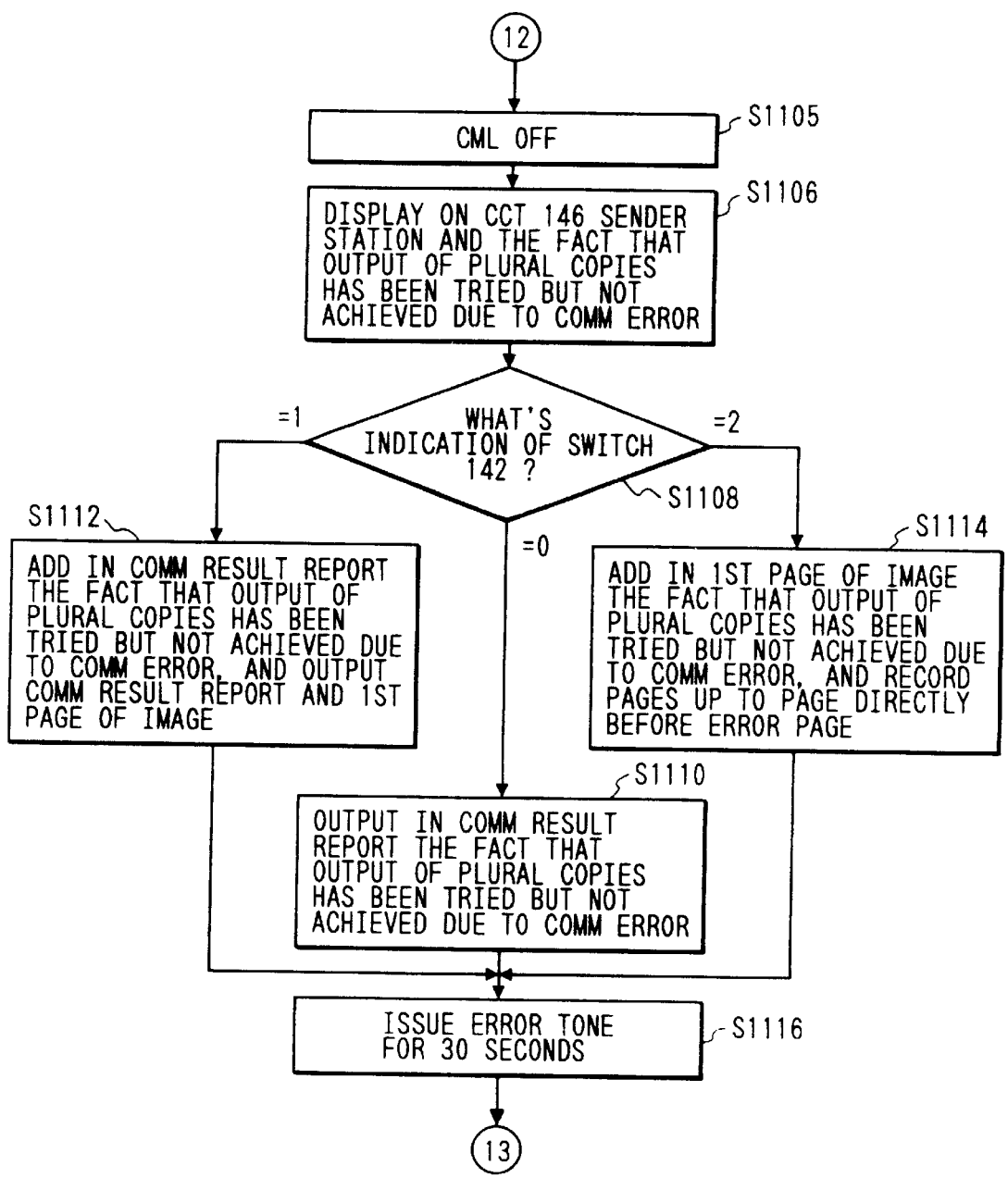
FIG. 11 is a flow chart showing the operation of the seventh embodiment.

FIGS. 9 to 11 are flow charts showing the operations of the controller 150 of this embodiment. The operations will be explained below with reference to these flow charts.

In step S1062, the controller 150 outputs a signal of signal level "0" onto the signal line 150*a* to turn off a CML. In step S1064, the controller 150 outputs a signal of signal level "0" onto the signal line 150*m* to disable the display circuit 146.

In step S1066, the controller 150 receives a signal on the signal line 148*a* to check if a registration mode of a telephone number of a plural-copies output sender station is selected. If YES in step S1066, the flow advances to step S1068, and the telephone number of the plural-copies output sender station is registered in the registration circuit 138.

On the other hand, if NO in step S1066, the flow advances to step S1070 to check if a facsimile receive mode is selected. If NO in step S1070, the flow advances to step S1072 to execute other processing.

However, if YES in step S1070, the flow advances to step S1073, and the controller 150 outputs a signal of signal level "1" onto the signal line 150*a* to turn on a CML. In step S1074, the controller 150 executes a pre-procedure.

In step S1076, the controller 150 checks if a TSI signal sent from a sender station is registered in the memory circuit 138, i.e., if information is received from a plural-copies output sender station. If YES in step S1076, the flow advances to step S1084; otherwise, the flow advances to step S1078.

The controller 150 executes the remaining pre-procedure in step S1078, and executes reception and recording of an image signal in step S1080. In this case, only a copy of received information is output. Thereafter, the controller 150 executes a post-procedure in step S1082, and the control then returns to a standby state (S1062).

On the other hand, the controller 150 executes the remaining pre-procedure in step S1084, and stores an image signal in the memory circuit 128 via the signal line 150*e* in step S1086.

In step S1088, the controller 150 checks if an error has occurred during reception of an image signal. If YES in step S1088, the flow jumps to step S1105 (to be described later). If NO in step S1088, the flow advances to step 1090 to check if reception of one page has ended. If NO in step S1090, the flow returns to step S1086 to wait for the end of reception of one page.

On the other hand, if YES in step S1090, the flow advances to step S1092 to execute a mid-procedure. The controller 150 checks in step S1094 if an error has occurred during the procedure. If YES in step S1094, the flow jumps to step S1105 (to be described later).

On the other hand, if NO in step S1094, the flow advances to step S1096 to check if the next page exists. If YES in step S1096, the flow returns to step S1086 to repeat processing for the next page; otherwise, the flow advances to step S1098 to execute a post-procedure.

In step S1100, the controller 150 outputs a signal of signal level "0" onto the signal line 150*a* to turn off a CML. In step S1102, the controller 150 receives the received information from the memory circuit 128 via the signal line 150*e*, and outputs a plurality of copies (e.g., five copies) of the received information. In step S1104, the controller 150 causes the communication result report circuit 140 to record a message indicating that a plurality of copies are output, on the communication result report.

In step S1105, the controller 150 outputs a signal of signal level "0" onto the signal line 150*a* to turn off a CML. In step S1106, the controller 150 outputs the sender station telephone number onto the signal line 150*l*, and thereafter, outputs a signal of signal level "1" onto the signal line 150*m*, thus causing the display circuit 146 to display a message indicating that the plural-copies output operation has been tried but cannot be achieved due to a communication error and information regarding the corresponding sender station.

In step S1108, the controller 150 receives the state of the reply action registration switch 142, and checks if the switch state is 0, 1, or 2. If the switch state is 0, the flow advances to step S1110; if it is 1, the flow advances to step S1112; or if it is 2, the flow advances to step S1114.

In step S1110, the controller 150 outputs a message indicating that the plural-copies output operation has been tried but cannot be achieved, onto the communication result report via the signal line 150*k*.

In step S1112, the controller 150 outputs the message indicating that the plural-copies output operation has been tried but cannot be achieved, onto the communication result report via the signal line 150*k*. Also, the controller 150 adds the message indicating that the plural-copies output operation has been tried but cannot be achieved, to the first page of an image via the signal line 150*f*, and outputs only the first page of the image.

Furthermore, in step S1114, the controller 150 adds the message indicating that the plural-copies output operation has been tried but cannot be achieved, to the first page of an image via the signal line 150*f*, and records the received information up to a page before an error page.

Thereafter, in step S1116, the controller 150 issues an error tone for 30 seconds and during this interval, the display circuit 146 is set in the display state in step S1106. Thereafter, the control returns to the standby state (S1062).

In the seventh embodiment described above, the telephone number of the plural-copies output sender station is registered, and only when information is received from the registered sender station, a plurality of copies of received information are output. Alternatively, a sender station may designate to output a plurality of copies of received information. In this case, the sender station may also designate the number of copies to be output.

In the seventh embodiment, in a facsimile apparatus which can output a plurality of copies of received information, the plural-copies output operation of facsimile information received in a communication which is terminated as an error is inhibited, and a receiver station is assumed to have no function of combining information received before an error and information re-sent from an error page to obtain complete information.

However, as the eighth embodiment of the present invention, a receiver station may have a function of combining information received before an error and information re-sent from an error page, and a sender station may have a function of re-sending information from an error page when an error occurs during a communication. In this case, when a plural-copies output communication mode is selected, and an error occurs during a communication, a plural-copies output operation may be inhibited until re-transmission from an error page ends, and complete information is obtained.

When a predetermined condition is satisfied, the plural-copies output operation is canceled, and after execution of a predetermined operation, information stored in the memory circuit is erased.

Note that the predetermined condition includes a case wherein re-transmission from the sender station is not performed within a predetermined period of time after termination as a communication error.

As the predetermined operation, for example, three different operations may be performed, and can be registered in the reply action registration switch 144. More specifically, when the switch 0 state is selected by the reply action registration switch 144, facsimile information received in a communication which is terminated as an error is not output at all, and only a communication result report is output. When the switch 1 state is selected, only the first page of facsimile information received in a communication which is terminated as an error, and a communication result report are output. Furthermore, when the switch 2 state is selected, only a copy of facsimile information received in a communication which is terminated as an error is output.

When a sender station does not have any function of re-sending information from an error page, and when the plural-copies output communication mode is selected, and an error occurs during a communication, the predetermined operation registered in the reply action registration switch 142 is executed, and thereafter, information stored in the memory circuit is erased.

In this case as well, when the plural-copies output communication mode is selected but is canceled due to an error during communication, a message indicating that the plural-copies output operation has been tried but cannot be achieved is displayed or recorded. Note that the message indicating that the plural-copies output operation has been tried but cannot be achieved is recorded on the communication result report or the first page of error information.

Figure 12:
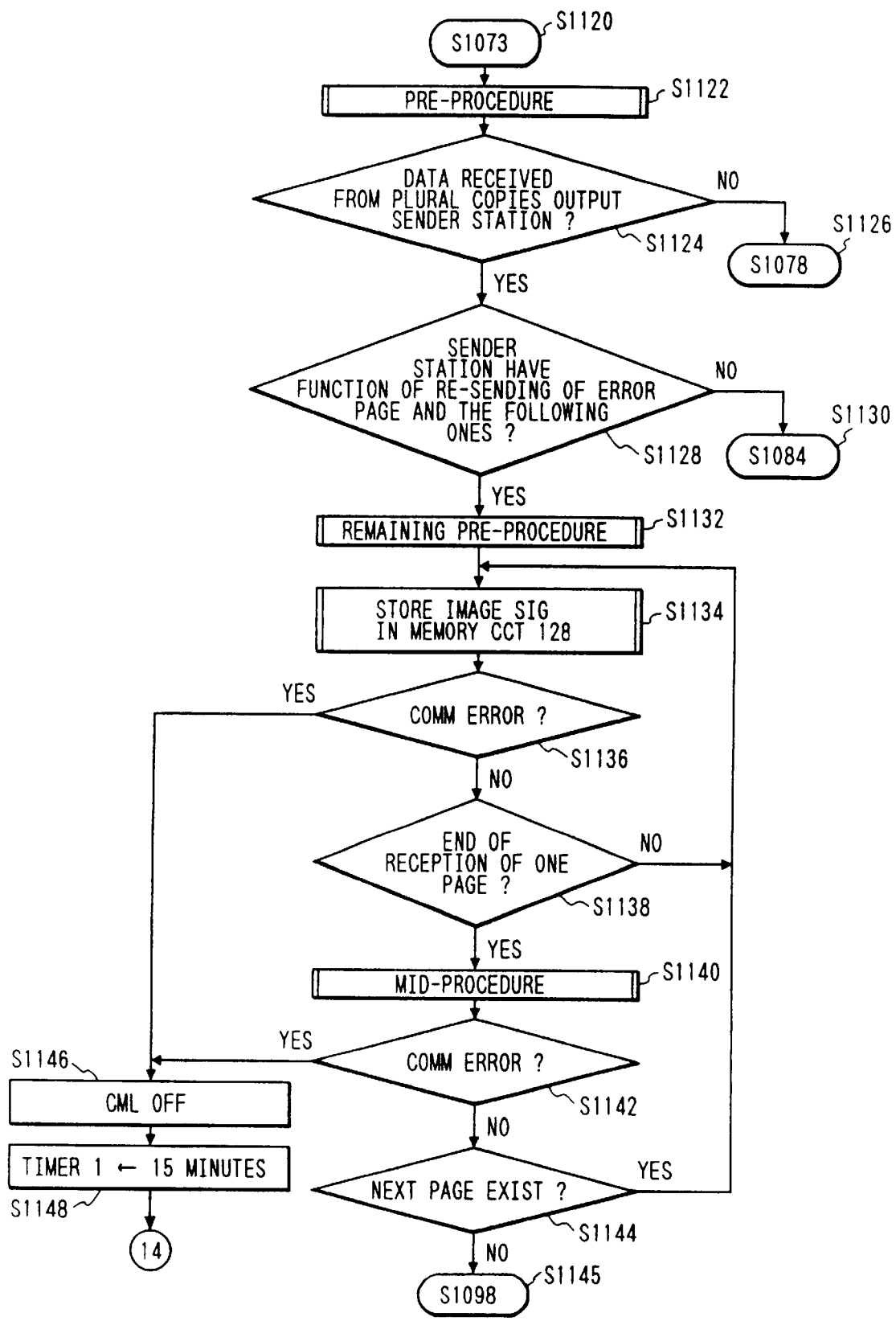
FIG. 12 is a flow chart showing the operation according to the eighth embodiment of the present invention.
Figure 13:
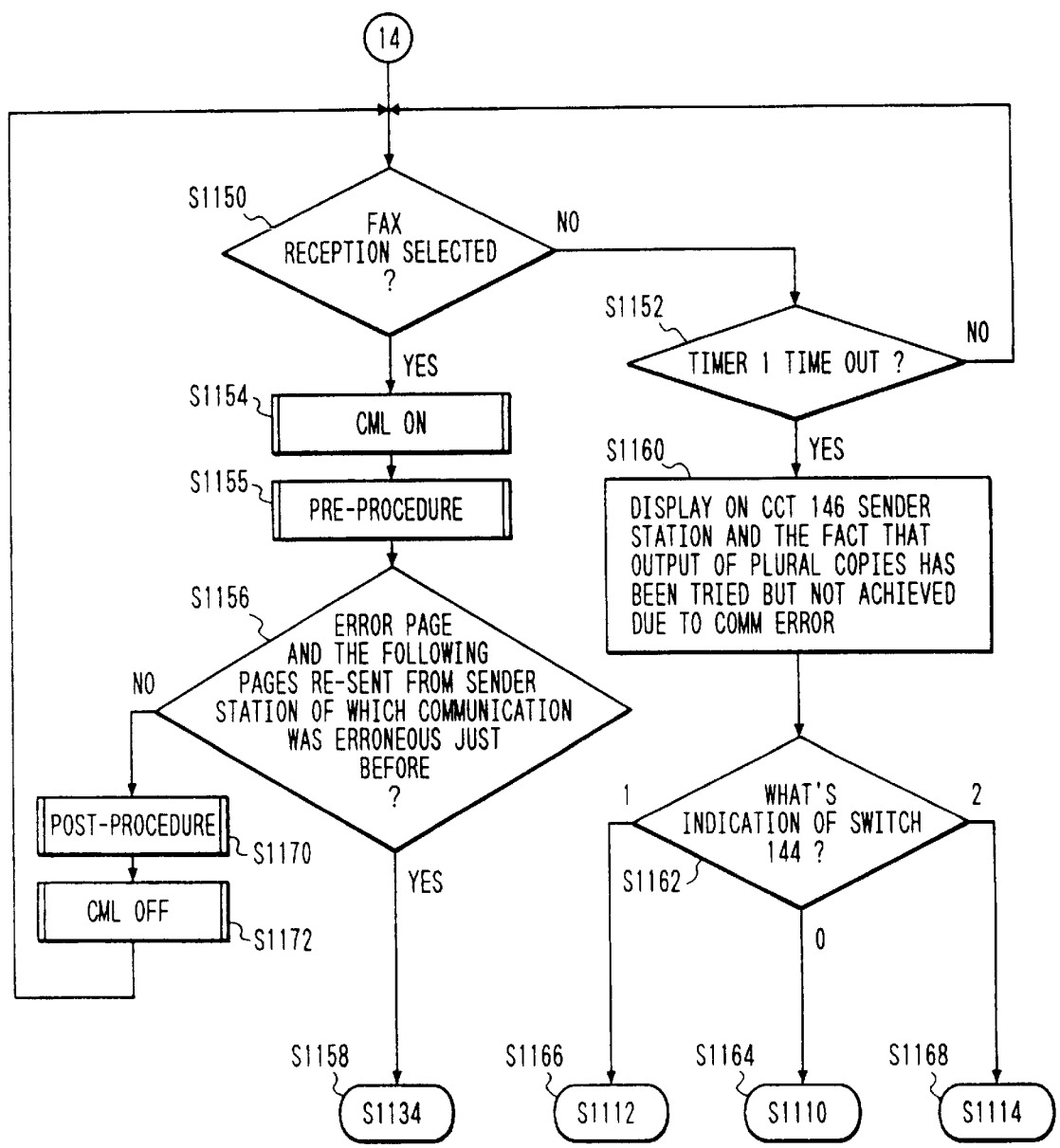
FIG. 13 is a flow chart showing the operation of the eighth embodiment.

FIGS. 12 and 13 are flow charts showing steps different from those in the seventh embodiment (FIGS. 9 to 11) in the operation of the controller 150 of the eighth embodiment.

Step S1120 corresponds to step S1073. In step S1122, the controller 150 executes a pre-procedure. When an error occurs during a communication, a message indicating that information re-sent from an error page can be combined with information received before an error and that a plurality of copies of complete information can be output is produced.

In step S1124, the controller 150 receives information from the memory circuit 138, and checks if information is received from a plural-copies output sender station. If NO in step S1124, the flow advances to step S1126 (S1078 above).

However, if YES in step S1124, the flow advances to step S1128 to check if the sender station has a function of re-sending information from an error page. If NO in step S1128, the flow advances to step S1130 (S1084 above).

On the other hand, if YES In step S1128, the flow advances to step S1132 to execute the remaining pre-procedure. In step S1134, the controller 150 stores an image signal in the memory circuit 128 via the signal line 150*e*.

The controller 150 checks in step S1136 if an error has occurred during reception of an image signal. If YES in step S1136, the flow advances to step S1146; otherwise, the flow advances to step S1138.

In step S1138, the controller 150 checks if reception of one page has ended. If NO in step S1138, the flow returns to step S1134 to continue the reception processing. On the other hand, if YES in step S1138, the controller 150 executes a mid-procedure in step S1140.

In step S1142, the controller 150 checks if an error has occurred during the mid-procedure. If YES in step S1142, the flow advances to step S1146; otherwise, the flow advances to step S1144.

In step S1144, the controller 150 checks if the next page exists. If YES in step S1144, the flow returns to step S1134 to execute processing for the next page; otherwise, the flow advances to step S1145 (S1098 above).

The controller 150 outputs a signal of signal level "0" onto the signal line 150*a* to turn off a CML in step S1146, and sets 15 minutes in timer 1 in step S1148.

In step S1150, the controller 150 checks if a facsimile receive mode is selected. If YES in step S1150, the flow advances to step S1154; otherwise, the flow advances to step S1152.

In step S1152, the controller 150 checks if timer 1 is time-out. If YES in step S1152, the flow advances to step S1160 (to be described later); otherwise, the flow returns to step S1150.

The controller 150 outputs a signal of signal level "1" onto the signal line 150*a* to turn on a CML in step S1154, and executes a pre-procedure in step S1155. When an error occurs during a communication, a message indicating that information re-sent from an error page can be combined with information received before an error and that a plurality of copies of complete information can be output is produced.

In step S1156, the controller 150 checks if information which is being received is one which is re-sent from an error page from the sender station which has just caused an error. If YES in step S1156, the flow advances to step S1158 (S1134 above), and the controller 150 stores received information in the memory circuit 128 to be continuous from the error page. However, if NO in step S1156, the controller 150 inhibits reception of an incoming call from that sender station. More specifically, the flow advances to step S1170 to execute a post-procedure, and the controller 150 outputs "0" onto the signal line 150a to turn off a CML in step S1172.

In step S1160, a message indicating that the plural-copies output operation has been tried but cannot be achieved, and the sender station are displayed on the display circuit 146. In step S1162, the controller 150 receives the state of the reply action registration switch 144. The controller 150 checks if the switch state is 0, 1, or 2. If the switch state is 0, the flow advances to step S1164 (S1100); if it is 1, the flow advances to step S1166 (S1112); or if it is 2, the flow advances to step S1168 (S1114).

In the embodiment shown in FIGS. 12 and 13, different operations to be executed when the plural-copies output operation is canceled are set depending on whether or not a sender station has a function of re-sending information from an error page. However, the same operation may be executed independently of whether or not a sender station has a function of re-sending information from an error page.

When a plural-copies output operation is canceled due to the switch 2 state of the reply action registration switch 142 or 144, the communication result report may be output.

Furthermore, in the above-mentioned embodiment, when a communication is terminated as an error, reception of other communication information is inhibited. Alternatively, reception of other communication information may be permitted, information received in the communication which is terminated as an error may be stored, and timer 1 may be stopped during reception of the other information.

As described above, according to the present invention, when an error occurs during a communication (including a case wherein no re-sending operation from an error page is performed after a communication error), the plural-copies output operation of incomplete received information is inhibited, and a message indicating this is recorded on a communication result report, thus preventing waste of recording sheets.

When information is received from a facsimile apparatus which can re-send information from an error page in an error communication, if the plural-copies output mode is selected, and an error occurs during a communication, information received before the error and stored in the memory, and received information re-sent after the error, are combined in the memory, and a plural-copies output operation of the combined information is performed. Thus, complete information can be output, and waste of recording sheets can be prevented. In addition, the re-send function of the sender station can be effectively utilized, and a proper communication can be realized.

What is claimed is:

1. A data communication apparatus comprising:

receiving means for receiving a plurality of communication data sent from respective sending parties, each communication data including at least output data to be output and party information identifying the respective sending party;

storage means for storing at least the party information of first communication data received by said receiving means at a first time;

output means for outputting data storage in said storage means;

managing means, responsive to reception by said receiving means of second communication data at a second time later than the first time, for determining a relationship between the output data of the first communication data and the output data of the second communication data based on the respective party information of the first and second communication data; and control means for combining the output data of the first communication data and the output data of the second communication data on the basis of the relationship determined by said managing means and for causing said output means to output combined output data a plurality of times.

2. An apparatus according to claim 1, wherein the output data of the first communication data comprises the data already received before the occurrence of an error and retained in said storage means, and the output data of the second communication data comprises the data not yet received at the occurrence of the error, and wherein said control means cancels the output data of the first communication data when the output data of the second communication data is not received from the sending party within a predetermined period after the occurrence of the error.

3. A method for data communication, comprising the steps of:

receiving a plurality of communication data sent from respective sending parties, each communication data including at least output data to be output and party information identifying the respective sending party;

storing at least the party information of first communication data received at a first time;

determining a relationship between the output data of the first communication data and output data of a second communication data received later than said first time based on the respective party information of the first and second communication data;

combining the output data of the first communication data and the output data of the second communication data on the basis of the relationship determined; and outputting the combined output data a plurality of times.

4. A data communication method according to claim 3, wherein the output data of the first communication data comprises the data already received before the occurrence of an error and retained in said storage means, and the output data of the second communication data comprises the data not yet received at the occurrence of the error, and wherein cancelling the output data of the first communication data when the output data of the second communication data is not received from the sending party within a predetermined period after the occurrence of the error.

5. A data communicating apparatus comprising:

receiving means for receiving data;

recording means for recording the received data on respective recording sheets;

storing means for storing sending party identification data identifying at least one sending party for whom received data is to be recorded on a plurality of the recording sheets;

identifying means for identifying a sending party that sent the received data; and control means for determining a number of the recording sheets on which the received data is to be recorded in accordance with the sending party identified by said identifying means and the sending party identification data, and for causing said recording means to record the received data on the determined number of recording sheets.

6. An apparatus according to claim 5, wherein the determined number is at least one.

7. An apparatus according to claim 5, wherein said control means compares the sending party identified by said identifying means with each sending party identified by the sending party identification information and, when the sending party identified by said identifying means is the same as one of the sending parties identified by the sending pary identification information, determines that the number is plural.

8. An apparatus according to claim 5, wherein said control means compares the sending party identified by said identifying means with each sending party identified by the sending party identification information and, when the sending party identified by said identifying means is not the same as any of the sending parties identified by the sending pary identification information, determines that the number is one.

9. An apparatus according to claim 5, further comprising storage means for storing the received data, wherein when said control means determines that the number is plural, said control means reads out the received data from the storage means the determined number of times and causes said recording means to record the read-out data each time on a respective recording sheet.

10. An apparatus according to claim 5, wherein the sending party identification information identifies a plurality of sending parties and a respective recording number for each such sending party, and wherein, when the sending party identified by said identifying means is the same as one of the sending parties identified by the sending party identification information, said control means determines the number to be equal to the respective recording number of the one sending party.

11. An apparatus according to claim 5, further comprising input means for manually inputting the sending party identification information.

12. An apparatus according to claim 5, wherein the received data is image data.

13. An apparatus according to claim 12, wherein said apparatus is a facsimile apparatus.

14. A method operative in a data communicating apparatus, said method comprising the steps of:

receiving data;

recording the received data on respective recording sheets;

storing sending party identification data identifying at least one sending party for whom received data is to be recorded on a plurality of the recording sheets;

identifying a sending party that sent the received data;

determining a number of the recording sheets on which the received data is to be recorded in accordance with the sending party identified at said identifying step and the sending party identification data; and causing said recording step to record the received data on the determined number of recording sheets.

15. A method according to claim 14, wherein the determined number is at least one.

16. A method according to claim 14, wherein said determining step compares the sending party identified at said identifying step with each sending party identified by the sending party identification information and, when the sending party identified at said identifying step is the same as one of the sending parties identified by the sending pary identification information, determines that the number is plural.

17. A method according to claim 14, wherein said determining step compares the sending party identified at said identifying step with each sending party identified by the sending party identification information and, when the sending party identified at said identifying step is not the same as any of the sending parties identified by the sending pary identification information, determines that the number is one.

18. A method according to claim 14, further comprising a second storing step of storing the received data, wherein when said determining step determines that the number is plural, said causing step reads out the stored received data the determined number of times and causes said recording step to record the read-out data each time on a respective recording sheet.

19. A method according to claim 14, wherein the sending party identification information identifies a plurality of sending parties and a respective recording number for each such sending party, and wherein, when the sending party identified at said identifying step is the same as one of the sending parties identified by the sending party identification information, said determining step determines the number to be equal to the respective recording number of the one sending party.

20. A method according to claim 14, further comprising an input step of manually inputting the sending party identification information.

21. A method according to claim 14, wherein the received data is image data.

22. A method according to claim 21, wherein the apparatus is a facsimile apparatus.

* * * * *

UNITED STATES PATENT AND TRADEMARK OFFICE
CERTIFICATE OF CORRECTION

PATENT NO. : 5,808,753
DATED : September 15, 1998
INVENTOR(S) : TAKEHIRO YOSHIDA It is certified that error appears in the above-identified patent and that said Letters Patent is hereby corrected as shown below:

COLUMN 10

Line 50, "registrating" should read --registering--.

COLUMN 17

Line 13, "pary" should read --party--.
    Line 21, "pary" should read --party--.

COLUMN 18

Line 17, "pary" should read --party--.
    Line 24, "pary" should read --party--.

Signed and Sealed this

Eleventh Day of May, 1999

Attest:

Q. TODD DICKINSON

Attesting Officer     Acting Commissioner of Patents and Trademarks